United States Patent
Patel et al.

(10) Patent No.: US 9,203,561 B2
(45) Date of Patent: Dec. 1, 2015

(54) METHOD AND APPARATUS FOR BURST START DETECTION

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Newport Beach, CA (US)

( * ) Notice: Subject to any disclaimer, the term of this patent is extended or adjusted under 35 U.S.C. 154(b) by 0 days.

(21) Appl. No.: 14/319,225

(22) Filed: Jun. 30, 2014

(65) Prior Publication Data

US 2015/0003570 A1   Jan. 1, 2015

Related U.S. Application Data

(60) Provisional application No. 61/841,379, filed on Jun. 30, 2013.

(51) Int. Cl.
| | |
|---|---|
| H04L 1/18 | (2006.01) |
| H04M 13/00 | (2006.01) |
| H04W 56/00 | (2009.01) |
| H04L 7/00 | (2006.01) |
| H04L 7/04 | (2006.01) |

(52) U.S. Cl.
CPC ............ *H04L 1/1832* (2013.01); *H04M 13/00* (2013.01); *H04W 56/0085* (2013.01); *H04L 7/0087* (2013.01); *H04L 7/042* (2013.01)

(58) Field of Classification Search
CPC .... H04L 7/0087; H04L 7/0332; H04L 1/1832
See application file for complete search history.

(56) References Cited

U.S. PATENT DOCUMENTS

| | | | | |
|---|---|---|---|---|
| 3,761,922 | A * | 9/1973 | Evans | 342/93 |
| 6,594,303 | B1 * | 7/2003 | Agrawal et al. | 375/145 |
| 6,658,242 | B1 * | 12/2003 | Knutson et al. | 455/232.1 |
| 2004/0071236 | A1 * | 4/2004 | Dhalla et al. | 375/345 |
| 2012/0155530 | A1 * | 6/2012 | Zhong | 375/233 |

* cited by examiner

*Primary Examiner* — Jean B Corrielus
(74) *Attorney, Agent, or Firm* — Lerner, David, Littenberg, Krumholz & Mentlik, LLP

(57) ABSTRACT

High speed serial links are used in many applications as they provide high throughput with limited number of signals and input/output pins. Normally, the high speed links are established once at power up and rarely taken down except for maintenance purposes. When the high speed serial links are used for battery operated devices, the power consumption of these links becomes an important issue. Dynamic high speed serial link establishment and shutdown techniques are used in such application to keep the power consumption low. Frequent link establishment and shutdown may cause occasional link establishment failures leading to latencies and even complete failure to communicate between two entities. A method and apparatus are disclosed that enable robust link establishment for more reliable operation and reduced latency.

20 Claims, 4 Drawing Sheets

METHOD AND APPARATUS FOR BURST START DETECTION

CROSS-REFERENCE TO RELATED APPLICATIONS

The present application claims the benefit of the filing date of U.S. Provisional Application No. 61/841,379, filed Jun. 30, 2013 and entitled "METHOD AND APPARATUS FOR BURST START DETECTION," the entire disclosure of which is hereby expressly incorporated by reference herein.

BACKGROUND OF THE INVENTION

The present invention relates generally to serial communications and, more particularly, to high speed low power asynchronous serial communications.

High speed serial communication devices transform wide bit-width, single-ended signal buses and compress them into a few, typically one, differential signal that switches at a much higher frequency rate than the wide single-ended data bus. High speed serial communication devices enable the movement of a large amount of data point-to-point while reducing the complexity, cost, power, and board space usage associated with having to implement wide parallel data buses.

Several high speed serial communication interface standards are particularly developed for mobile applications to obtain low pin count combined with improved power efficiency.

Unlike traditional high speed serial links, serial communication interface standards such as MIPI (Mobile Industry Processor Interface) M-PHY use a BURST mode operation for improved power efficiency. The burst mode of operation allows the links to be turned off when not required which improves the power efficiency. This presents a problem while re-starting the high speed serial link when required. To enable this burst mode operation, the M-PHY standard uses a series of specific symbols called PREPARE prior to starting the transmission of a new payload data. The receiver side is expected to detect the start of a transmission burst based on sequence of the PREPARE symbols. To ease the implementation and to ensure high degree of detectability, a PREPARE symbol is defined to be sequence of 10 ones.

The start of a burst may be defined by some minimum number of PREPARE symbols. For example, the M-PHY standard specified minimum of four PREPARE symbols. Note that the high speed serial links use some form of line coding to ensure that there are enough transitions in the transmitted data to enable the receiver to recover the clock and data. For example, the M-PHY standard uses the 8b10b coding to ensure that there is sufficient density of transitions and the DC balance is maintained. The PREPARE symbol is not considered to be a part of the normal payload data and therefore it does not follow the 8b10b coding rules.

At the receiver side, typically the incoming differential signal is first amplified, equalized, time aligned and sliced to extract the decoded serial bits. These serial bits are then further processed to detect the sequence of PREPARE symbols.

Conventional methods detect the start of the burst by using different methods but generally involve counting the number of consecutive ones received in the incoming data. This method is simple and generally effective. However, under poor signal conditions the incoming signal may be corrupted by a variety of noise sources which can cause random errors in the decoding of the incoming data. These random errors may prevent the receiver from detecting the start of a burst. This in turn leads to the loss of information contained in the entire burst. This can lead to retransmissions at higher protocol layer, which may results in latencies that may not be acceptable in some applications. Therefore, it is essential to detect the start of a burst by detecting the PREPARE symbols with very high degree success.

Conventional methods for PREPARE symbols detection fail to achieve the required degree of reliability or they may require the transmitter to send a longer sequence of PREPARE symbols. Sending longer number of PREPARE symbols reduces the bandwidth utilization of the high speed serial link which is not desirable.

SUMMARY OF THE INVENTION

In accordance with one aspects of the present invention, a communication subsystem for use in high speed serial communication in a wireless mobile station is provided. The communication subsystem comprises a buffer and an accumulator. The buffer is configured to receive an input bit stream from a serial communication source and to output a first bit stream. The accumulator is configured to receive the input bit stream from the serial communication source and to output a second bit stream. The communication subsystem also includes a sliding window integrator device coupled to the buffer and the accumulator. The sliding window integrator device is configured to compute a result of all bits received from the first and second bit streams over a length of a predetermined sliding window, and is configured to output an identification of a burst start from the serial communication source using the result.

In one example, the length of the predetermined sliding window is configurable. In another example, the output of the sliding window integrator device is a logical "0" (e.g., low signal value) when the serial communication source is idling and not active. In a further example, when a new burst of transmission starts from the serial communication source, the output of the sliding window integrator device starts increasing and reaches a maximum when all of the bits within the sliding window are set to a logical "1" (e.g., high signal value). In another example, when communication data is being received from the serial communication source, the output of the sliding window integrator device will be on the order of half of the length of the sliding window.

In one alternative, a decision threshold to declare reception of a sequence of received symbols as the burst start is set based on a length of the sliding window and an expected DC balance in the received input bit stream. The decision threshold may be mid-way between a maximum possible output when the sequence of symbols are received and a maximum output possible when 8b10b data are received. The decision threshold may set on the order of 75% of the length of the sliding window. And the sequence of received symbols may be one of a sequence of PREPARE symbols or is a SYNC pattern.

In accordance with another aspect of the present invention, a wireless mobile station comprises a baseband subsystem including one or more controllers and one or more signal processing units operatively connected to the one or more controllers, and a radio frequency subsystem operatively connected to the baseband subsystem. The radio frequency subsystem includes a buffer configured to receive an input bit stream from a serial communication source and to output a first bit stream, an accumulator configured to receive the input bit stream from the serial communication source and to output a second bit stream, and a sliding window integrator device coupled to the buffer and the accumulator. The sliding window integrator device is configured to compute a result of all bits received from the first and second bit streams over a length of a predetermined sliding window, and is configured to output an identification of a burst start from the serial communication source using the result.

In one example, when communication data is being received from the serial communication source, the output of the sliding window integrator device will be on the order of half of the length of the sliding window. In another example, a decision threshold to declare reception of a sequence of received symbols as the burst start is set based on a length of the sliding window and an expected DC balance in the received input bit stream. The decision threshold may be mid-way between a maximum possible output when the sequence of symbols is received and a maximum output possible when 8b10b data are received. The decision threshold may be set on the order of 75% of the length of the sliding window.

In accordance with a further aspect of the present invention, a method of detecting a start of serial communication in a wireless mobile station. The method comprises buffering an input bit stream received from a serial communication source to be output as a first bit stream; accumulating the input bit stream received from the serial communication source to be output as a second bit stream; comparing, using a sliding window integrator, a result of all bits received from the first and second bit streams over a length of a predetermined sliding window; and outputting, from the sliding window integrator, an identification of a burst start from the serial communication source using the result.

In one example, the method further comprises setting the length of the predetermined sliding window. In another example, the method further comprises setting a decision threshold to declare reception of a sequence of received symbols as the burst start based on a length of the sliding window and an expected DC balance in the received input bit stream. The decision threshold may set mid-way between a maximum possible output when the sequence of symbols is received and a maximum output possible when 8b10b data are received. The method may further comprise correlating the input bit stream with a local replica of an expected SYNC symbol pattern to detect a configurable amount of correlation, and when the configurable amount of correlation has been detected, declaring detection of a SYNC pattern.

In another alternative, the burst start includes one or more PREPARE symbols and the method further comprises reducing a number of required PREPARE symbols based on the identification of the burst start.

DETAILED DESCRIPTION

Figure 1:
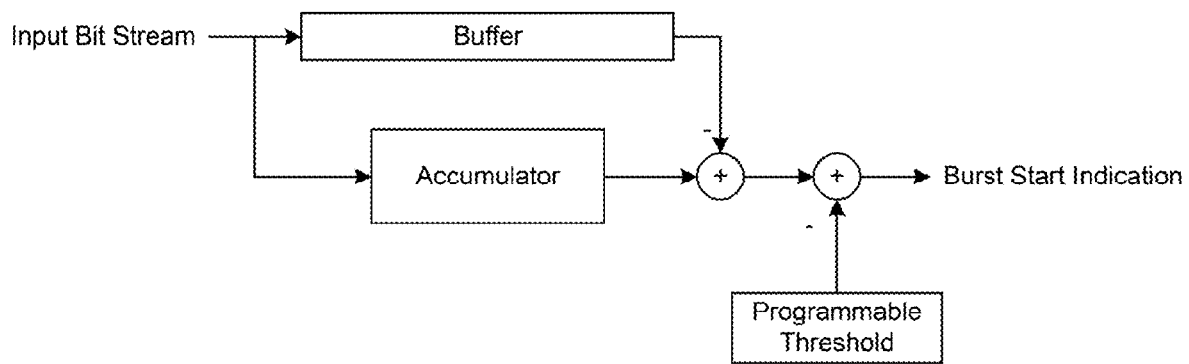
FIG. 1 illustrates a burst detection method of operation according to an aspect of the present invention.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

A method and apparatus are disclosed that enable the detection of the start of burst in poor signal conditions with reduced number of PREPARE symbols and improved reliability.

According to an aspect of the present invention, a sliding window integrator is used to generate a decision metric. The decoded serial bits are fed into the sliding window integrator as shown in FIG. 1. The sliding window integrator computes the sum of all the bits input to it over the duration of the window. The sliding window integrator may include a buffer and an accumulator. Data from the buffer and the accumulator may be integrated as shown, and evaluated against a threshold to determine a burst start indication.

According to an aspect of the present invention, the length of the sliding window integrator may be configurable. Under nominal conditions, the output of the sliding window integrator will be zero when the serial link is idling and not active. When a new burst of transmission starts, the sliding window integrator output starts increasing and reaches a maximum when all the bits within the window of the sliding window are one. When the normal data is being received, the output of the sliding window integrator will be approximately half of the length of the sliding window. This is based on the fact that the line coding used in high speed serial links such as 8b10b coding maintain a DC balance over a period of one symbol duration.

According to an aspect of the present invention, the threshold to declare the reception of a PREPARE symbols sequence may be set based on the length of the sliding window and the expected DC balance in the receive signal. For example, in case of 8b10b coded data, the decision threshold may be mid way between the maximum possible output when PREPARE symbols are received and the maximum output possible when normal 8b10b data are received. Specifically, the threshold to detect the PREPARE symbols may be set to 75% of the length of the sliding window integrator. This method enables reliable detection of the start of burst under very high error rate conditions. Specifically for up to just below 25% error rate in the PREPARE symbols sequence, the present invention can detect the start of burst when the threshold to detect the PREPARE symbols is set to 75% of the length of the sliding window integrator. The threshold may be higher or lower than 75%, for instance between about 65% to 85%, no more than 80%, or at least 70%.

The present method improves the detectability of the start of burst and therefore improves the reliability of the communications link. This in turn may allow the number of required PREPARE symbols to be reduced and therefore improves the link utilization. Above factors in turn lead to reduced power consumption in the high speed serial links.

The present method of sliding window integrator may be applied to the detection of other markers or patterns embedded in high speed serial communication links, e.g., the detection of SYNC pattern in MIPI MPHY standard. Instead of looking for a fixed number of integral number of SYNC symbols, the incoming bit stream may be correlated with the local replica of the expected SYNC symbol pattern, the proposed method may be applied to detect a configurable amount of correlation (percentage correlation) to declare the detection of a SYNC pattern.

Figure 2:
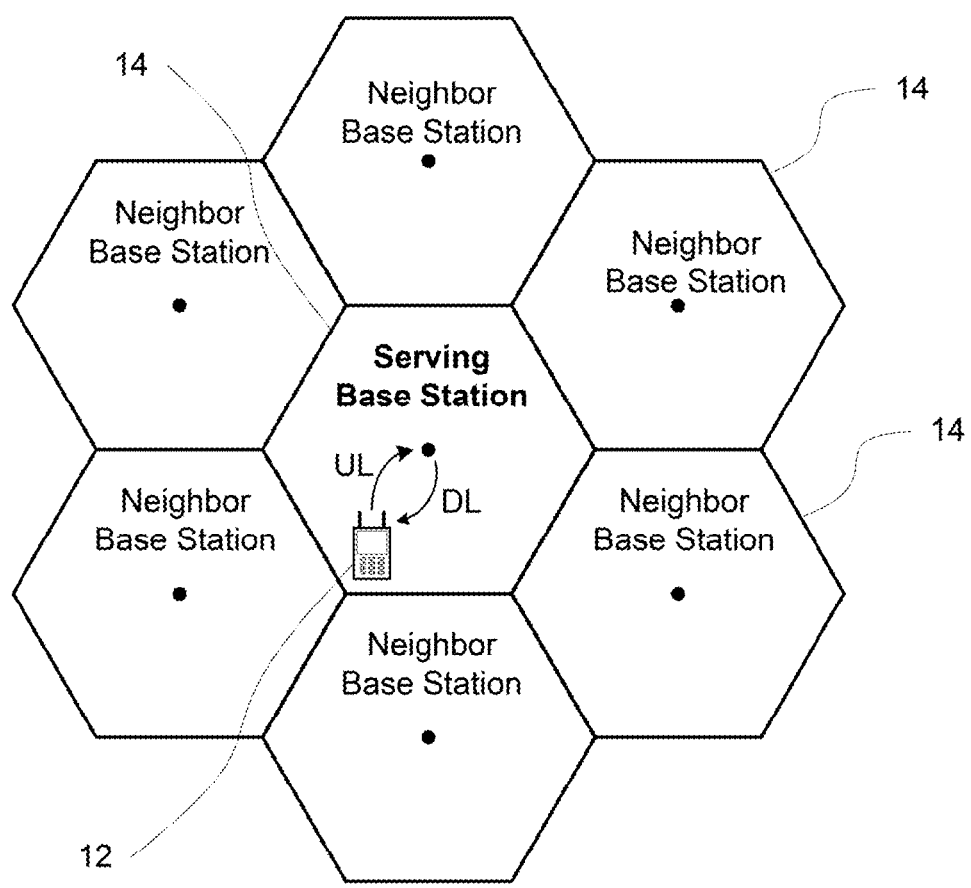
FIG. 2 illustrates a conventional wireless cellular communication system.

By way of example only, the above-described method may be implemented in a receiver of, e.g., a user device such as a wireless mobile station ("MS") 12 as shown in FIG. 2.

Figure 3:
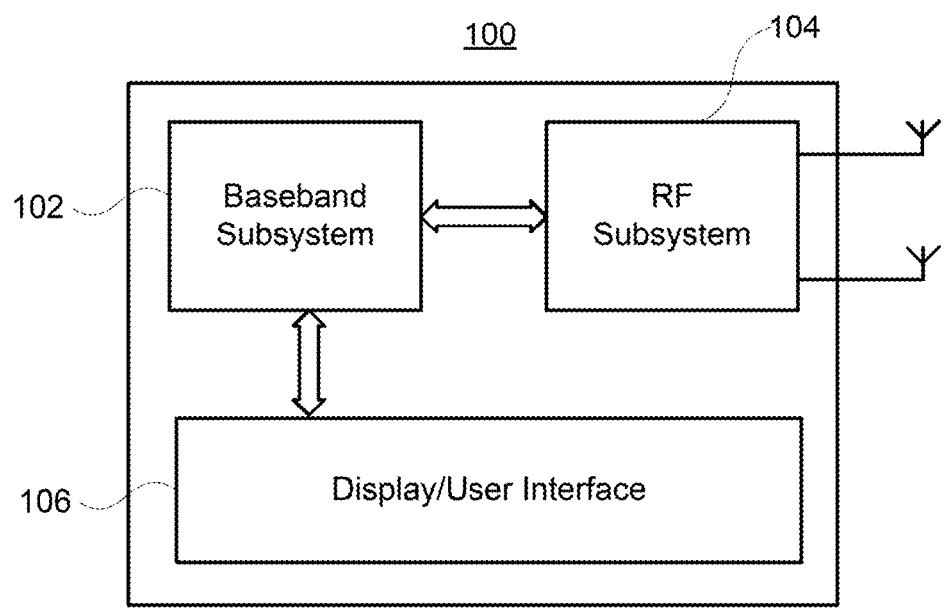
FIG. 3 illustrates a wireless mobile station diagram for use with aspects of the invention.

As shown in FIG. 3, MS 100 may include a baseband subsystem 102 and a radio frequency ("RF") subsystem 104 for use with a wireless communication network. A display/user interface 106 provides information to and receives input from the user. By way of example, the user interface may include one or more actuators, a speaker and a microphone.

The baseband subsystem 102 and a RF subsystem 104 may be high speed serial communication devices communicating through the high speed communication link.

Figure 4:
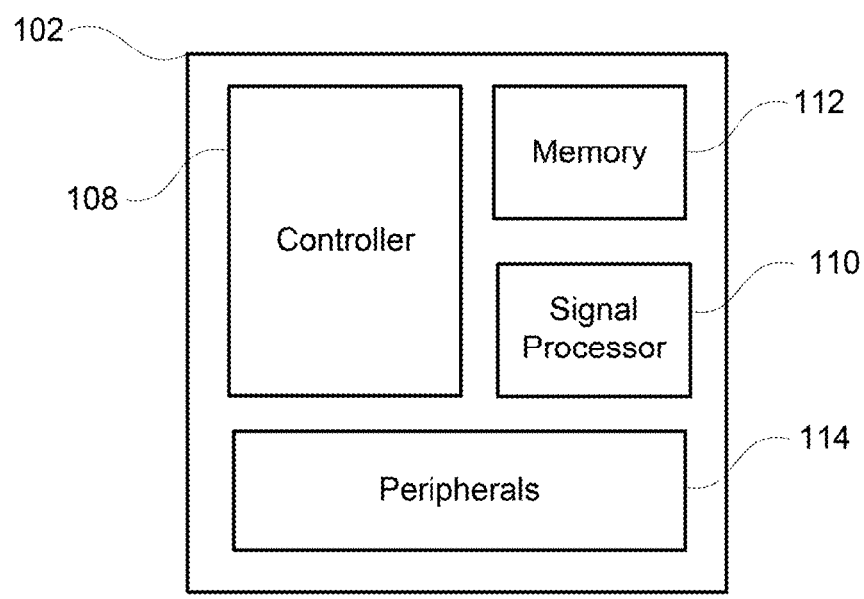
FIG. 4 illustrates a baseband subsystem for a wireless mobile station for use with aspects of the invention.
Figure 5:
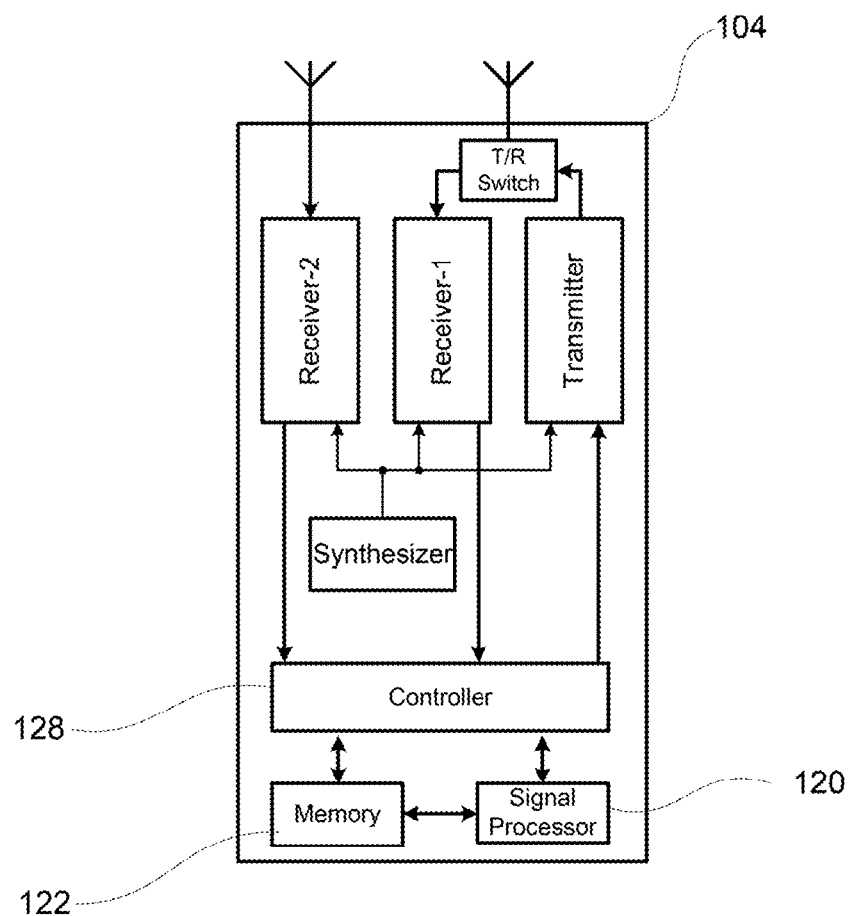
FIG. 5 illustrates an RF subsystem for a wireless mobile station for use with aspects of the invention.

The baseband subsystem 102 as shown in FIG. 4 may include a controller 108 such as a microcontroller or other processor. The RF subsystem 104 as shown in FIG. 5 may include a controller 108 such as a microcontroller or other processor. The controller 108 desirably handles overall operation of the MS 100, including management of the RF subsystem 104. This may be done by software or firmware running on the controller 108. Such software/firmware may embody any methods in accordance with aspects of the present invention.

A signal processor 110 may be used to process samples from the RF subsystem 104 or other information sent or received by the MS 100. The signal processor 110 may be a stand-alone component or may be part of the controller 108. Memory 112 may be shared by or reserved solely for one or both of the controller 108 and the signal processor 110. For instance, signal processing algorithms may be stored in a non-volatile section of memory 112 while coefficients and other data parameters may be stored in RAM. Peripherals 114 such as a full or partial keyboard, video or still image display, audio interface, etc may be employed and managed through the controller 108.

The RF subsystem 104 preferably provides two-way communication operation. It may include one or more receivers/receive chains, a transmitter, a synthesizer, a power amplifier, and one or more antennas operatively coupled together to enable communication. The receive chain(s) is operable to receive signals from one or more channels in a wireless communication network. A signal processor 120 may be used to process samples from the baseband subsystem 102. The signal processor 120 may be a stand-alone component or may be part of the controller 128. Memory 122 may be shared by or reserved solely for one or both of the controller 128 and the signal processor 120. For instance, signal processing algorithms may be stored in a non-volatile section of memory 122 while coefficients and other data parameters may be stored in RAM.

Aspects of the present invention may be implemented in firmware of the signal processor 110 and/or the controller 108 of the baseband subsystem. In another alternative, aspects of the present invention may also be implemented as a combination of firmware and hardware of the baseband subsystem. For instance, a signal processing entity of any or all of the FIG. 4 may be implemented in firmware, hardware and/or software. It may be part of the baseband subsystem, the receiver subsystem or be associated with both subsystems.

In one example, the controller 108 and/or the signal processor 110 may include or control the protocol entity circuitry. The software may reside in internal or external memory and any data may be stored in such memory. The hardware may be an application specific integrated circuit ("ASIC"), field programmable gate array ("FPGA"), discrete logic components or any combination of such devices. The terms controller and processor are used interchangeably herein.

Aspects of the present invention may be implemented in firmware of the signal processor 120 and/or the controller 128 of the RF subsystem 104. In another alternative, aspects of the present invention may also be implemented as a combination of firmware and hardware of the RF subsystem. For instance, a signal processing entity of any or all of the FIG. 5 may be implemented in firmware, hardware and/or software. The software may reside in internal or external memory and any data may be stored in such memory. The hardware may be an application specific integrated circuit ("ASIC"), field programmable gate array ("FPGA"), discrete logic components or any combination of such devices. The terms controller and processor are used interchangeably herein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A communication subsystem for use in high speed serial communication in a wireless mobile station, the communication subsystem comprising a sliding window integrator device, the sliding window integrator device including:
    a buffer configured to receive an input bit stream from a serial communication source and to output a first bit stream; and
    an accumulator configured to receive the input bit stream from the serial communication source and to output a second bit stream;
    wherein the sliding window integrator device is configured to compute a result of all bits received from the first and second bit streams over a length of a predetermined sliding window, and is configured to output an identification of a burst start from the serial communication source using the result.

2. The communication subsystem of claim 1, wherein the length of the predetermined sliding window is configurable.

3. The communication subsystem of claim 1, wherein the output of the sliding window integrator device is a logical "0" when the serial communication source is idling and not active.

4. The communication subsystem of claim 1, wherein, when a new burst of transmission starts from the serial communication source, the output of the sliding window integrator device starts increasing and reaches a maximum when all of the bits within the sliding window are set to a logical "1".

5. The communication subsystem of claim 1, wherein, when communication data is being received from the serial communication source, the output of the sliding window integrator device is on the order of half of the length of the sliding window.

6. The communication subsystem of claim 1, wherein a decision threshold to declare reception of a sequence of received symbols as the burst start is set based on the length of the sliding window and an expected DC balance in the received input bit stream.

7. The communication subsystem of claim 6, wherein the decision threshold is mid-way between a maximum possible output when the sequence of symbols are received and a maximum output possible when 8b10b coded data are received.

8. The communication subsystem of claim 7, wherein the decision threshold is set on the order of 75% of the length of the sliding window.

9. The communication subsystem of claim 6, wherein the sequence of received symbols is one of a sequence of PREPARE symbols or is a SYNC pattern.

10. A wireless mobile station, comprising:
a baseband subsystem including one or more controllers and one or more signal processing units operatively connected to the one or more controllers; and
a radio frequency subsystem operatively connected to the baseband subsystem, the radio frequency subsystem including a sliding window integrator device, the sliding window integrator device having:
a buffer configured to receive an input bit stream from a serial communication source and to output a first bit stream; and
an accumulator configured to receive the input bit stream from the serial communication source and to output a second bit stream;
wherein the sliding window integrator device is configured to compute a result of all bits received from the first and second bit streams over a length of a predetermined sliding window, and is configured to output an identification of a burst start from the serial communication source using the result.

11. The wireless mobile station of claim 10, wherein, when communication data is being received from the serial communication source, the output of the sliding window integrator device is on the order of half of the length of the sliding window.

12. The wireless mobile station of claim 10, wherein a decision threshold to declare reception of a sequence of received symbols as the burst start is set based on the length of the sliding window and an expected DC balance in the received input bit stream.

13. The wireless mobile station of claim 12, wherein the decision threshold is mid-way between a maximum possible output when the sequence of symbols are received and a maximum output possible when 8b10b coded data are received.

14. The wireless mobile station of claim 13, wherein the decision threshold is set on the order of 75% of the length of the sliding window.

15. A method of detecting a start of serial communication in a wireless mobile station, the method comprising:
buffering an input bit stream received from a serial communication source to be output as a first bit stream;
accumulating the input bit stream received from the serial communication source to be output as a second bit stream;
comparing, using a sliding window integrator, a result of all bits received from the first and second bit streams over a length of a predetermined sliding window; and
outputting, from the sliding window integrator, an identification of a burst start from the serial communication source using the result.

16. The method of claim 15, further comprising setting the length of the predetermined sliding window.

17. The method of claim 15, further comprising setting a decision threshold to declare reception of a sequence of received symbols as the burst start based on the length of the sliding window and an expected DC balance in the received input bit stream.

18. The method of claim 17, wherein the decision threshold is set mid-way between a maximum possible output when the sequence of symbols are received and a maximum output possible when 8b10b coded data are received.

19. The method of claim 17, further comprising:
correlating the input bit stream with a local replica of an expected SYNC symbol pattern to detect a configurable amount of correlation; and
when the configurable amount of correlation has been detected, declaring detection of a SYNC pattern.

20. The method of claim 15, wherein the burst start includes one or more PREPARE symbols, and the method further comprises reducing a number of required PREPARE symbols based on the identification of the burst start.

* * * * *